Dec. 29, 1953  J. C. BOONSHAFT  2,664,011
LIQUID DENSITY MEASURING EQUIPMENT
Filed Feb. 18, 1949  3 Sheets-Sheet 1

INVENTOR
Julius C. Boonshaft
BY
ATTORNEYS

Dec. 29, 1953   J. C. BOONSHAFT   2,664,011
LIQUID DENSITY MEASURING EQUIPMENT
Filed Feb. 18, 1949   3 Sheets-Sheet 2

INVENTOR
Julius C. Boonshaft
BY
ATTORNEYS

Dec. 29, 1953  J. C. BOONSHAFT  2,664,011
LIQUID DENSITY MEASURING EQUIPMENT
Filed Feb. 18, 1949  3 Sheets-Sheet 3

INVENTOR
Julius C. Boonshaft
BY
ATTORNEYS

Patented Dec. 29, 1953

2,664,011

UNITED STATES PATENT OFFICE 2,664,011

LIQUID DENSITY MEASURING EQUIPMENT

Julius C. Boonshaft, Pensauken, N. J., assignor to Precision Thermometer and Instrument Company, a corporation of Pennsylvania Application February 18, 1949, Serial No. 77,203

13 Claims. (Cl. 73—33)

This invention relates to liquid density measuring equipment, and more particularly to that type of equipment wherein a member submerged in the liquid is adapted to move up and down with changes in the density of the liquid, and, by its position and/or movement, produces density indications which may be employed in the regulation of the density of the liquid. Certain features of the invention are also useful in the type of equipment wherein a float is the member initially responsive to changes of density, but the invention as a whole has special advantages when employing a totally submerged plummet, and also involves features peculiarly or solely adapted for incorporation with such a plummet, and also novel features of the plummet itself and of certain assemblies or sub-assemblies embodying the same; and the invention is therefore herein illustrated and described with particular reference to equipment of this character. (Except where otherwise qualified specifically or by context, the term plummet means a device which when weighted in accordance with this disclosure occupies a position of buoyant equilibrium under a condition of partial or total immersion in the liquid whose density is being measured.)

The prior art has been known to employ a density responsive member subject to the variable action of a weight, whereby the equilibrium position of said member will be different for different densities of the liquid being measured; and my equipment employs, inter alia, that principle. In the prior art, however, there are numerous disadvantages and unsolved problems. For example, the variably employed weight may be in the form of a loop of chain which hangs in such a way as to pull the float or plummet against the side of the measuring vessel or against some support therein, thus setting up friction and introducing errors; or it may be in the form of a pile of chain on the bottom of a vessel, the links of which become tangled or kinked. Another drawback is that which arises from the deposition or precipitation of materials from the liquid, which in many prior art constructions impairs the proper and accurate functioning of the parts. Another defect is the inapplicability of any one design to both a continuous and in intermittent measuring system. Also, in the known continuous systems there appears to be no practical mechanism of the submerged-plummet type. Still further, in the matter of remote indication or recording (as contrasted with known arrangements for direct indication at the float) the prior art is characterized by complexities and inaccuracies in the electrical circuits or other systems used.

The chief object of the present invention is to overcome such difficulties and disadvantages as well as numerous others, and in general to provide an accurate, reliable, durable, and easily installed density measuring equipment or system, which is easy to service, inspect, test, adjust, and alter for use with different liquids and different densities and density ranges, and which may be employed for density indication, density recording, or density regulation, or any two or all of these functions.

More particularly, it is an object of the invention to increase the sensitivity and accuracy of mechanism for determining and/or controlling liquid density, and to accomplish this by a plummet type of device wherein errors due to friction, manufacturing inaccuracies, and other causes, are reduced to a minimum, and further wherein continuous measurement of a flowing or circulating liquid may be had, either for continuous indicating, recording, or controlling, or any combination of these, and wherein disturbances or inaccuracies of the mechanism owing to liquid flow, turbulence, gas bubbles, suspended particles, or deposited solids, are minimized.

The invention further contemplates the accomplishment of one or more of the preceding objects by mechanism which is accurately settable to a mid, zero, neutral or normal position; which may be adjusted to different such settings, and for use with different liquids and for different densities and ranges of density; and which may be easily and quickly installed, serviced or replaced, by relatively unskilled workmen; and wherein inspection, cleaning, replacement or substitution of parts may be very readily done, either with or without removal of various other parts or of the equipment as a whole.

Still other objects and features of the invention relate to the construction and operation of the plummet; the sampling mechanism including chamber and associated plummet and weights; an electrical pickup system; electrical circuits adapted to accurately translate plummet positions and/or movements into density indications, recordings, or control operations; temperature compensation; and features of the electrical system by which alternating current may be used to power the pickup and the final power mechanisms for recording, indicating or controlling, while at the same time employing standard commercially-available direct-current-responsive elements for operating the ultimate indicating, recording and controlling devices.

How the foregoing objects and advantages, together with such others as are incident to the invention or may occur to those skilled in the art, are attained, will be apparent from the following detailed description of the construction and operation of the present preferred embodiment of the invention illustrated in the accompanying drawings, in which drawings.

Figure 1:
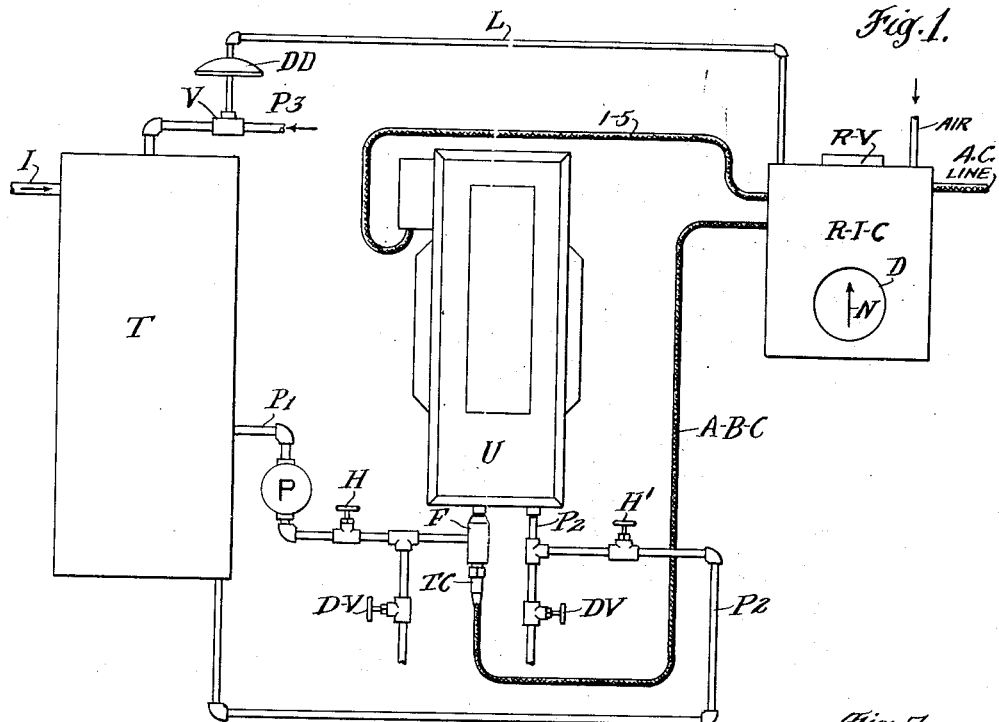
Figure 1 is a schematic layout of a typical installation of the equipment of the present invention in association with a tank of liquid of variable density and an indicating and recording controller for regulating the density of the solution or other liquid in the tank.
Figure 7:
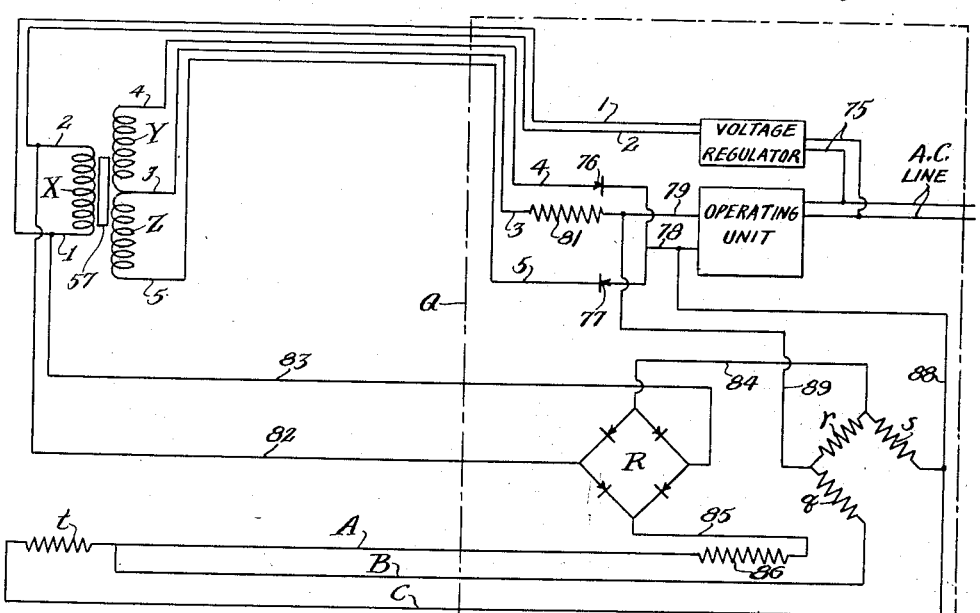
Figure 2:
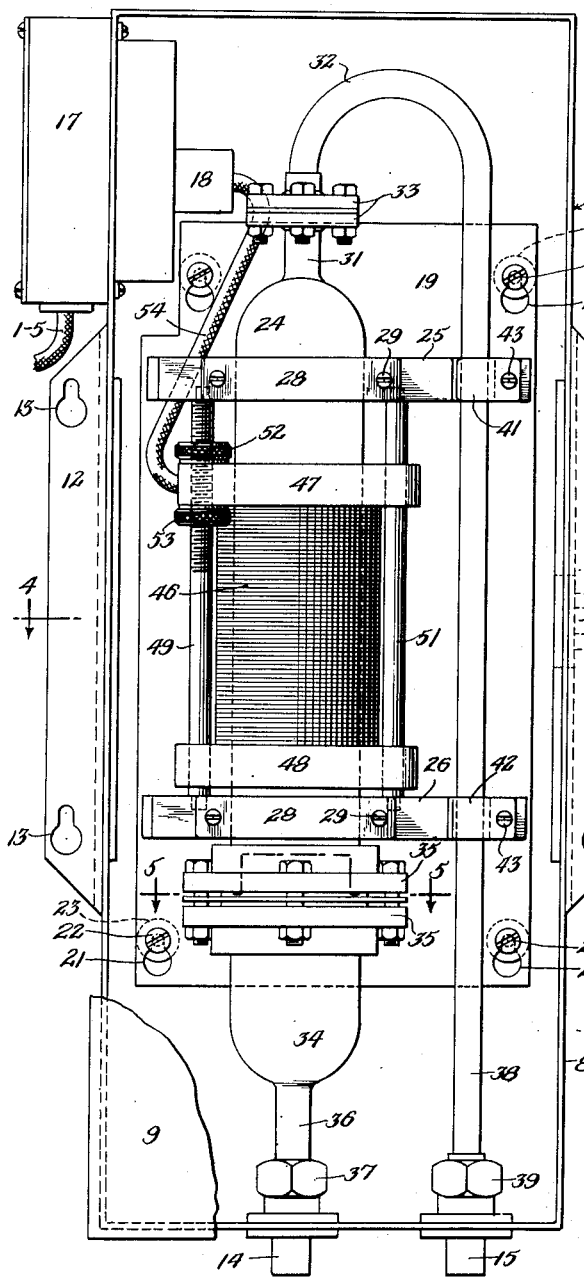
Figure 2 is an enlarged face view, with most of the cover removed, of the sampling unit of my equipment, which unit is the oblong box-like structure shown in the center of Figure 1.
Figure 3:
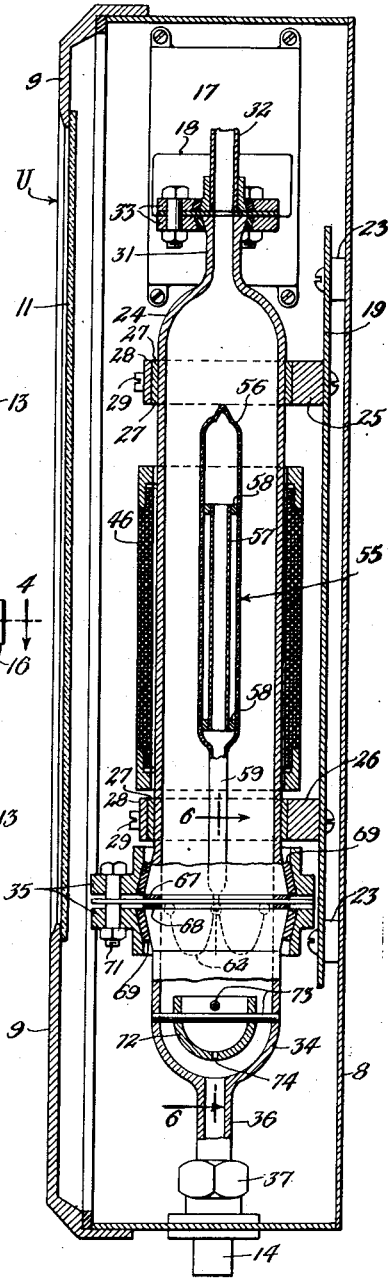
Figure 3 is a vertical sectional view through said unit, taken on the line 3—3 of Figure 2, with certain parts shown in elevation, but illustrating in section the major part of the plummet and its core, within the sampling chamber, and an electrical pickup device surrounding said chamber.
Figure 4:
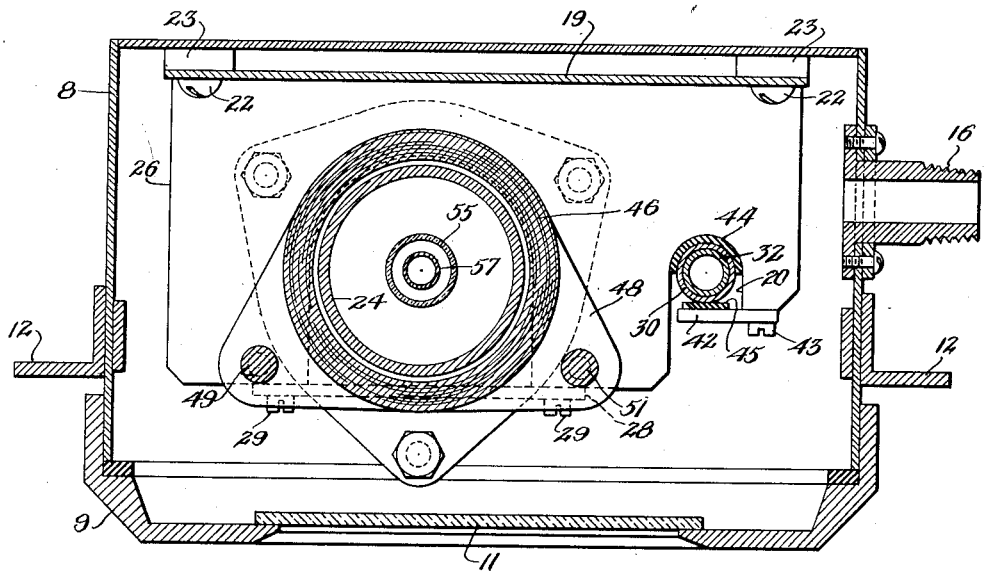
Figure 4 is an enlarged horizontal section taken on the line 4—4 of Figure 2.
Figure 6:
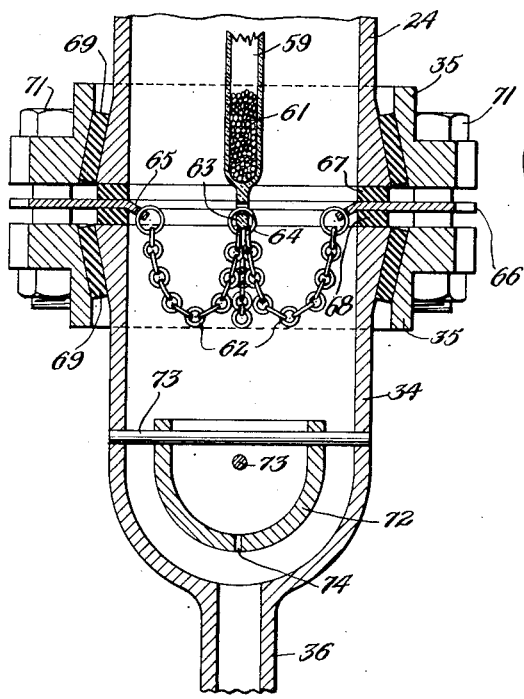
Figure 5:
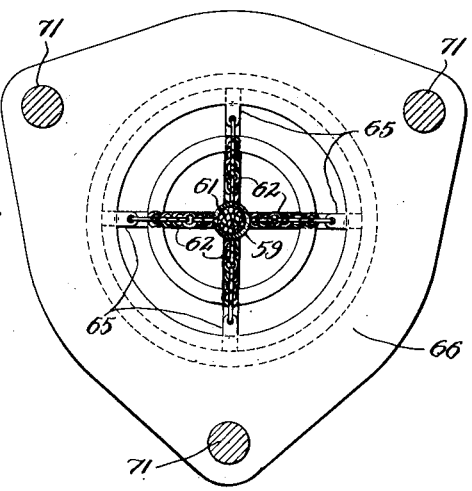
Figure 5 is an enlarged horizontal section taken on the line 5—5 of Figure 2, showing the reference plate and variably-acting weighting chains in elevation, and the fixedly-weighted lower portion of the plummet in section.

Figure 6 is an enlarged vertical section, on the scale of Figure 5, taken on the line 6—6 of Figure 3, showing the lower end of the plummet at what may be termed the neutral, zero or mid-position, and illustrating the assembly of the chains and reference plate, their relationship to the joint in the sampling chamber, and the inlet opening and flow directing baffling; and Figure 7 is a wiring diagram of the present preferred electrical system constituting part of the installation shown in Figure 1; portions of this electrical system involving novel combinations, and novel associations with certain of the other parts shown in Figures 1 to 6.

In the diagrammatic or schematic layout of Figure 1 the tank T may be any ordinary mixing, storage, evaporating or treatment tank or the like, with a general inlet I (and a similar outlet if required) for any liquid, or combination of liquids or of liquids and solids, whose density is to be measured ("measured" meaning determined for any or all of the purposes of indicating, recording or regulating the density). The sampling unit of the present invention is indicated generally at U, and the response of this unit to the measured density conditions is electrically translated, through suitable means, hereinafter described, including the 5-wire cable 1–5, into terms of indication, recording, and/or control, by mechanism chiefly housed in the box R-I-C.

The sampling unit (though quite operative for intermittent density determination) is here installed for continuous determination of the density of a flowing body of the liquid to be measured. The liquid flow is via pipe P1, pump P, hand valve H, and fitting F into the sampling unit U, and from thence via pipe P2 and hand valve H' back to the tank T. Actually, this same set-up may be used for intermittent operation, as by drawing a sample from tank T, and then shutting off pump P and closing valves H and H'. Such operation is sometimes advantageous and may be essential when measuring the density of highly viscous materials. Drain valves D-V are also provided, for the purpose of entirely draining the system when not in use.

The power for operating the indicating and recording controller R-I-C is derived from the cable marked "A. C. Line." In the preferred embodiment, this instrument, among other things, contains certain known elements (hereinafter described in more detail) including an indicating and recording needle and dial, diagrammatically shown at N and D, and a known type of regulating valve, the cover of which is marked R-V, for regulating the flow or pressure of compressed air from a source marked "Air" through a control line L, to act upon a diaphragm device or the like D—D which controls a valve V to regulate the admission to the tank T of a make-up solution or the like entering through P3, whereby to regulate the density of the main body of liquid in said tank (for example to maintain it constant.

The general features of this installation are completed by a temperature compensator TC associated with the fitting F and coupled by the 3-wire cable A—B—C to the unit R-I-C.

Although the equipment has been shown in use with a tank, having a make-up line controlled by a valve, it should be understood that other devices may be used with it. For example, tank T might be an evaporator, and the pipe P3 might be a steam line.

Referring now to Figures 2 to 6, showing features of the sampling unit U, it will be seen that this comprises a main frame 8, in the form of a box or housing, having a cover 9 with a glass front portion 11. The frame and housing 8 may have a pair of mounting flanges 12 disposed in any suitable position, which, as typically shown in Figure 4, are disposed near the front of the housing so that most of the housing may be recessed within a wall if desired. The housing 8 may be fixedly or movably mounted by means of the apertures 13 and any suitable fasteners cooperating therewith.

The bottom of the housing 8 may be pierced by an inlet pipe 14 and an outlet pipe 15 for the liquid to be measured. To these are normally connected the fitting F and the pipe P2 (as shown in Fig. 1), which connections may be more or less permanent. In addition, an air purge connection may be made at 16 for admitting air under a slight pressure, to keep out moisture, corrosive gases, or explosive gases, depending upon where the instrument is used.

Within the housing 8, or extending therein from the outside (as shown), is an electrical junction box 17, in which may be permanently connected the 5-wire cable 1–5. The five conductors thereof (to be described in more detail hereinafter) terminate in a receptacle into which may be coupled the 5-wire plug 18.

The main operating mechanism of the sampling unit may be readily removed and replaced without disturbing the main frame or housing just described. This mechanism is mounted on a supplementary frame or sub-frame 19, which is removably supported in the main casing, as by means of slotted apertures 21 engaging studs 22 having collars 23.

The sampling chamber 24 is mounted on the supplementary frame by a pair of brackets 25—26, which at the back have screws fastening them to the plate 19, and which towards the front have U-shaped openings, of a transverse dimension equal to the outside diameter of the sampling chamber plus the cushioning collars 27. The chamber is retained in place by the straps 28 and screws 29. The cushioning collars 27 may be of rubber, cork, compressed asbestos, or various other materials, depending upon temperature of the liquid being measured, and other conditions.

At the top, the chamber 24 has an outlet neck 31, with a slightly flared end coupled to a corresponding end of the return bend 32 by means of a pair of tapered flanges 33, suitable gaskets, and nuts and bolts. The flared ends of the joined parts may be integrally formed (as in the case of part 31) or may be separately formed, and secured in fluid-tight relation (as in the case of pipe 32). The gaskets may be of various materials, such for example, as mentioned for the cushioning collars, depending upon the chemistry and temperature of the materials being handled.

At the lower end the chamber is completed by a cup member 34 which has a flared upper end coupled to the flared lower end of the main chamber wall, the junction being made by suitable flanged collars 35 and the gaskets and nuts and bolts shown. The lower end of the member 34 has an inlet neck 36 adapted for connection to pipe 14 by the union 37. Similarly the outlet end 38 of the return-bend pipe 32 is coupled to pipe 15 by a union 39. The return-bend pipe 32, 38, is secured in the brackets 25 and 26 by the ears 41, 42, and the screws 43—suitable cushion means being provided at 44, 45, which may be of various materials, as hereinabove suggested. Additionally, a metal filler collar 30 is here provided, to accommodate the metal pipe to the size of the cushion 44; since the slot 20 and said cushion are made large enough to take a thick-walled glass tube.

In the latter regard, it should be noted that most of the liquid-enclosing parts in this device are herein illustrated as being of metal, which may, for instance, be brass, Monel, lead, antimony alloys, Hastelloy, stainless steel, etc., depending upon the temperature, pressure, and chemical conditions encountered; but the instrument is designed for ready use or substitution of other materials, for example Pyrex or other glass, various plastics, etc., or any machinable material required or desired, and different materials may be used for different parts. It should also be observed that to this end the joints in and at the ends of the sampling chamber are of the flared, gasketed and bolted type and of standard proportions characteristic of glassware joint practice; and according to the preferred embodiment of my invention the metal parts are thus made interchangeable and interfittable with glass parts. Thus also the front cover of the unit has a transparent portion so as to permit visual observation of the internal operation, when transparent parts are used, and also to permit inspection of the coil adjustment and the parts generally.

Before turning to the details of construction within the sampling chamber, brief reference will be made to the electrical pickup device. For certain fundamentals of the invention, this may take any known form, but with certain specific objects in view, the preferred and novel form herein illustrated comprises, in conjunction with a submerged plummet, a differential transformer of the type having a triple winding (later referred to) which in general is shown as a coil 46 surrounding the outside of the main body 24 of the sampling chamber. This coil is mounted by end brackets 47, 48, upon a pair of vertical guide rods 49, 51, the ends of which are reduced in diameter to fit into apertures in the supporting brackets 25, 26, as shown. At least a part of one of the rods 49, 51, (in this case the upper end of rod 49) is threaded so that a pair of knurled nuts 52, 53 may cooperate therewith for adjusting the coil 46 axially of the chamber, i. e. in a vertical direction. The 5-wire cable 1–5 coupled to the coil or winding 46 is completed by the section of cable 54 which terminates in the plug 18 and is thus simply a means of connection between the five leads of the coil 46 and the five wires in the cable 1–5. This section of the cable may extend up through a slot in the bracket 25, and has enough slack to permit of the adjustment of the coil just mentioned.

It will now be seen that by uncoupling the unions 37, 39, and pulling out the plug 18, the entire internal assembly can be raised so that the heads of the screws 22 may clear the larger portion of the openings 21, so that the supplementary frame 19 and all that it carries may be lifted and pulled forwardly right out of the main frame or box.

Referring to Figs. 3, 5 and 6, it will be seen that the elongated sampling chamber is, in this embodiment, a passageway for a continuously-flowing current of the liquid to be tested. While it might, for certain installations be no greater in diameter than the piping with which it is in series, it is here of an enlarged cross section as compared with the inlet and outlet 36 and 31, so that for a given flow rate in the latter the rate will be considerably slower in the main body 24.

Centrally disposed in the upright sampling chamber is the plummet 55 which has a hollow upper part 56 of a diameter suitable for enclosing the tubular metal core 57 (supported therein by spacing and cushioning collars 58), and a lower part 59 of reduced diameter which encloses lead shot or some other permanent weight 61. For certain purposes a constant diameter may be used. The plummet tube is in this instance made of glass and the tubular metal core is of transformer steel, the intermediate collars being for example of some fibrous material or a plastic, or of "Transite" (a Johns-Manville heat-resisting material). A variety of other materials may be used, as hereinabove explained. The materials and proportions of all the parts making up the plummet are such that the immersed plummet will remain upright, and, for the normal density of the liquid in which the plummet is immersed, the plummet will be in equilibrium (as to buoyancy) when it is at the normal mid-position of its operating range, with half of the variable weight 62 supported from it—as in Figs. 3 and 6. In some instances the core may be solid. In other cases the plummet shell may be formed of a metal which will itself serve as a core.

According to the preferred embodiment of the invention, the variably-imposed weight 62 comprises a plurality of chains of perfectly round links (in this case, four substantially identical chains of uniform weight per unit of length) coupled to the bottom loop 63 of the plummet by a ring 64, and, at their opposite (outer) ends, by similar rings to the apertured ears 65 of the annular reference plate 66. This plate is sealed into the joint between chamber body parts 24 and 34 by the gasket rings 67, 68 which (together with the main gaskets 69) are held tightly by the bolts 71 which also pass through the supporting reference plate 66, as seen in Figs. 5 and 6. The chain and supporting plate are desirably made of tantalum, or for other purposes a platinum-irridium alloy, or of various other materials having little or no tendency to become plated, coated, or corroded, in the particular liquid being measured.

In order to reduce turbulence of the liquid and to direct the flow along the wall surface of the chamber, so as to avoid disturbance of the chains and plummet, there is a cup-like baffling device 72 secured in uniformly spaced relation to the bottom of the chamber, as by the transverse rods 73. A drain hole 74 is in the bottom of the baffle element, for use when the whole unit is out of operation. In a metal construction, the rods 73 are welded into the walls of the member 34. In a glass construction, the baffle 72 may have suitable protuberances which may be fused to the glass shell member 34.

It may here also be noted that various of the other parts of the sampling unit may be connected by welding, fusing, or threading, according to the nature of the material used.

The electrical system may be briefly described as follows (with reference chiefly to Fig. 7). From the A. C. line, wires 75 go to a voltage regulator. Input wires 1 and 2 extend from thence to the winding X of the differential transformer associated with the plummet core 57. The other two windings Y and Z have a common central take-off wire 3 and each an end take-off, 4 and 5, respectively. The windings X, Y and Z constitute the coil 46 of Figs. 2 and 3, and the wires 1, 2, 3, 4 and 5 constitute the cable 1-5 of Figs. 1 and 2.

The output of the transformer is rectified by any suitable rectifying devices, as shown at 76, 77, and the wire from these two is connected at 78 to the operating unit of the indicating and recording controller. The other connection 79 to said unit is taken from wire 3 through a calibrating resistor 81. Power for the operating unit is taken directly from the A. C. line as shown.

The correction of the system for temperature changes in the liquid being tested is by means of a direct-current Wheatstone bridge ($q$, $r$, $s$, $t$), one arm, $t$, of which is the resistance thermometer already described as located in the temperature compensating device TC extending into the inlet fitting F. The current for the Wheatstone bridge may come by any convenient route from the voltage regulator, as by taps 82, 83 (taken from any part of cable wires 1, 2) through rectifier means indicated at R. The rectified current goes to the bridge via connection 84, and circuit 85, 86, A, and B. The element 86 is a calibrating resistor, and the wires A and B are two of the wires of the cable A—B—C already described. The third wire C of said cable completes the bridge. The variable current from the bridge passes to the leads of the operating unit by means of wires 88, 89. It should be noted that the 3-wire hook-up A—B—C to the resistance $t$ is employed (rather than using a common conductor which might otherwise be used for most of the length of A and B) for purposes of cancelling out the effects of the length as well as the temperature of the cable A—B—C, where a long distance—possibly several hundred feet—separates the sampling unit U and the controller R-I-C.

At this point it may be helpful to state more fully the functioning of the temperature compensator. Assuming that the liquid make-up remains constant, the density of this liquid will vary with temperature. The temperature compensating bridge is used to bring the scale indication at N to a reading which describes the density of this liquid in terms of its density at a specific temperature regardless of the existing temperature of liquid at the time of measurement. For example, if liquid flowing through the sampling chamber is at a temperature of 100° C. and a density of 1.000 (assuming the current output into the indicator to be 1 microampere) if the liquid temperature changes to 110° C., (assuming the make-up of the liquid to remain the same) the density of the liquid will fall to .99 and the current output to the indicator (from the differential transformer) will fall to .99 microampere.

A calibrating resistor is used in the temperature compensating bridge to adjust the current output of this bridge to what is required to nullify the drop in current caused by lowering of the liquid density effected by the increased temperature. The calibrating resistor in the example would be set so that a 10° temperature rise at arm $t$ would give an output of .01 microampere (at wires 88, 89) which, added to the existing indication of .99 microampere, will bring the total current output (going into the operating unit at 78, 79) back to the 1 microampere which denotes a density of 1 at 100° C., in this example.

In Fig. 7 the chain-dotted outline Q may be considered as embracing all the parts which are within the control instrument R-I-C of Fig. 1. On the other hand, any one or more of the parts shown within the outline Q may be omitted from the instrument R-I-C, excepting the one marked "Operating Unit," or, if used, may be located elsewhere. It will be understood that this operating unit may comprise or consist of any one or more of the standard commercially available indicating and/or recording and/or controlling devices, available on the market for the measurement of the voltage or current output of an electrical system (which may be broadly termed "monitoring devices"). These known devices usually operate on a D. C. circuit, with current or voltage of very small magnitude. For instance they may be indicating and/or recording galvanometers, or any type of device for amplifying a small direct current and thereby controlling one or more motors driven from the "A. C. Line" to actuate a pointer and/or a rotating recording dial and/or a valve such as the regulating valve RV for the compressed air line. In some such known operating units the direct current input controls the normal A. C. current through relays and switches.

By employing as an electrical pickup (surrounding the sampling chamber) a variable reactance device, such as the differential transformer X, Y, Z, or any other suitable electrical or electro-magnetic or electro-static pickup (preferably operative on alternating current— with or without a voltage regulator, depending upon requirements) and then rectifying the output, I am enabled to employ in the system any one or more of the above-described D. C. "operating units" which are available from such sources as Brown Instrument Company, Foxboro, Leeds & Northrup, and others.

On such known devices one may readily apply any of a variety of calibration scales, for example Baumé, °A. P. I., S. G., etc.

Where the transformer X, Y, Z is used, manufacturing variations may be tolerated, since the calibrating resistor 81 can be used to compensate therefor, thereby avoiding the need for and cost of extremely accurate electrical equipment.

By making the sampling instrument with readily interchangeable chain-plummet-reference point assemblies, a single installation may be used for operation at various ranges, for example: 1.01 to 1.06 density, .805 to .810 density, 7–11° Baumé and 9–14° Twaddell. By the construction shown, the substitution of such an assembly may be made in approximately ten minutes.

By way of example only, and not of limitation, a typical sampling instrument according to this invention may employ a plummet of from 5 to 8½ inches in length and of a diameter (for the upper part) of 14 millimeters to 27 millimeters. The volume and weight of the plummet with reference to the weight of the chains per unit of length are ordinarily so proportioned that the plummet travel is between an inch and 2½ inches, for the normal intended range of density measurement. Ample clearances are provided for plummet and chain movements, although if for any reason they move to an extreme position there is no damage done to the instrument. The range of the instrument may be altered or enlarged (for example doubled) by adjusting the vertical position of the coil 46. This also simplifies the plummet manufacture, as the plummet need not be made quite as accurate as would otherwise be necessary.

In a typical installation, the flow rate through the sampling instrument shown may be between 0 and .5 gallon per minute, with little or no influence upon accuracy of the instrument, except in the case of extremely viscous liquids, which require stopping of flow for a period of time depending upon the viscosity.

The use of a plurality of weighting chains whose weight acts symmetrically relative to the plummet axis, not only tends to center the plummet and avoid the inaccuracies due to the rubbing which would otherwise occur between the plummet and the side wall, but also has the advantage of substantially reducing the effect of errors in chain uniformity, so that here again the manufacturing accuracy of the chain need not be as great as would be necessary if a single chain were used.

The equipment is adapted for use with liquids of great difference in pressure, for example from vacuum conditions all the way up to 1000 p. s. i. (depending upon the materials used). Also, very high and low temperatures may be safely used. Practically speaking, there is no lower temperature limit for use of the sampling instrument and it appears feasible to use it with liquids up to 600° C. or more—the present limiting factor being the insulation material for the coil 46.

With the equipment and system herein disclosed, it is feasible to operate, with continuous flow, upon liquids of viscosities as high as 1000 centistokes, and with a variation permissible, for a given setting of the instrument, of plus or minus 100 centistokes. These are typical examples, though not limitations. With minimum clearance of ¼ inch between parts in the sampling chamber, solids in the liquid, up to $\frac{3}{32}$ inch mean diameter may be easily tolerated without introducing appreciable inaccuracies, and slugs up to nearly ¼ inch may pass, and the instrument will indicate average density of all material in the chamber, including solids and gas bubbles. The plummet action is entirely without friction and is self-damping; and density determination is not affected by vibration.

The equipment can be readily designed to operate for a full-scale span of .005 density or less, or any other span up to .2 density (or equivalent), within the absolute density limits of .5 through 3.5; and for any of these scale-spans the system will normally have a possible error not exceeding plus or minus 3% of scale-span or 0.0002 density, whichever is greater. The zero setting by means of the adjustment of the coil 46 permits the instrument to be adjusted, in the field, with as great a degree of accuracy, at the working point or range, as the accuracy of the measuring standard itself. For all ranges, the system has a sensitivity of ½% of the range.

From the foregoing detailed description it will now be obvious how the invention accomplishes the numerous objects and advantages set out at the beginning of the specification.

I claim:

1. In density measuring equipment, a liquid-enclosing chamber, a plummet therein, and a plurality of elongated flexible weight means connected between the chamber and the plummet and formed and arranged to variably coact therewith in a manner to influence the effective buoyancy thereof as it rises or falls in the direction of its vertical axis, said weight means being so disposed that its mass acts coaxially on said plummet at a fixed vertical axis in said chamber throughout the normal range of vertical movement thereof.

2. The construction of claim 1 adapted for continuous liquid flow and having baffling configured to direct said flow symmetrically relative to said axis of the plummet whereby any action of the inflowing liquid upon said plummet and weight means is symmetrical with reference to the said axis.

3. The construction of claim 2 including an attachment mounted on the chamber and connected with the weight means whereby to center the plummet in the chamber.

4. In density measuring equipment, a liquid enclosing chamber, a plummet therein and a plurality of chains each connected between the chamber and the plummet and formed and arranged to variably coact therewith in a manner to influence the effective buoyancy thereof as it rises or falls in the direction of its vertical axis, said chains being so disposed that the mass acts coaxially on said plummet at a fixed vertical axis in said chamber throughout the normal range of vertical movement thereof.

5. In density measuring equipment, a liquid-enclosing chamber, a plummet therein disposed for submersion in the liquid to be measured, and a mass having a substantially symmetrical relationship to the vertical axis of the plummet and so disposed as to variably weight said plummet as it rises or falls, said mass comprising a plurality of substantially identical chains coupled to the plummet and to the chamber and radiating in equi-spaced relation from the center of said plummet when viewed in plan.

6. In density measuring equipment, a liquid-enclosing chamber, a replaceable plummet therein disposed for submersion in the liquid to be measured, a plurality of elongated, flexible, replaceable means connected with the chamber and the plummet and acting symmetrically on the plummet to center its axis as it rises or falls, and an electrical translation device responsive to changes in the depth of submersion of said plummet, including a pickup element connected with the chamber and having an adjustment device regulable in situ for effecting a fine, progressive, adjustment of said pickup element axially of said chamber.

7. For density measuring equipment, a sub-assembly comprising a buoyant member and a plurality of elongated flexible weight devices connected thereto and extended therefrom at different peripheral points thereof, the free ends of said weight devices being adapted to be connected at angularly spaced points of a liquid chamber.

8. The sub-assembly of claim 7, wherein each weight device is a chain.

9. The sub-assembly of claim 7, wherein said chains are formed of circular links.

10. For density measuring equipment, a sub-assembly comprising a buoyant member and a plurality of elongated flexible weight devices connected thereto and extended therefrom at different peripheral points thereof and a reference member to which said devices are also connected at angularly spaced points radially of said first member.

11. The sub-assembly of claim 10 wherein said reference member is configured for readily securing it to or removing it from the wall of a measuring chamber, whereby said assembly or parts thereof may be removed from the equipment and replaced.

12. For a device of the character described, a plummet comprising: an elongated glass tube having a top section and a bottom section, the bottom section being of smaller diameter than the top and the two sections being separated by an internal shoulder; a generally cylindrical core of magnetic material disposed in said upper section; upper and lower separator rings between said core and said glass tube, the lower ring being disposed adjacent said shoulder; and a weight in the bottom section of the said glass tube.

13. In density measuring equipment: a liquid sample-receiving unit containing a movable plummet which is positioned in accordance with the density of the liquid; a density monitoring device; means connected with a source of alternating current; a first network including a differential transformer having a core connected to and movable with said plummet, primary and secondary windings mounted on said unit, a primary winding being electrically connected with said means and a secondary winding electrically connected with said monitoring device, last said connection including a rectifier; and a second network including a second rectifier connected with said means, a bridge circuit, the input of which is electrically connected with the second rectifier and the output of which is electrically connected with said monitoring device, one arm of the bridge having a temperature compensating resistor associated with said liquid sample-receiving unit and adapted to be influenced by the temperature of the liquid.

JULIUS C. BOONSHAFT.

References Cited in the file of this patent

UNITED STATES PATENTS

| Number | Name | Date |
|---|---|---|
| 907,107 | Courtois | Dec. 15, 1908 |
| 1,546,702 | Bailey | July 21, 1925 |
| 1,559,421 | Greet | Oct. 27, 1925 |
| 1,664,840 | Wermine | Apr. 3, 1928 |
| 2,050,629 | Quereau et al. | Aug. 11, 1936 |
| 2,342,441 | Will | Feb. 22, 1944 |
| 2,362,661 | Peters et al. | Nov. 14, 1944 |
| 2,445,255 | Younkin | July 13, 1948 |
| 2,445,880 | Hathaway et al. | July 27, 1948 |

FOREIGN PATENTS

| Number | Country | Date |
|---|---|---|
| 596,874 | Great Britain | Jan. 13, 1948 |